(12) United States Patent
Birn

(10) Patent No.: US 6,488,604 B1
(45) Date of Patent: Dec. 3, 2002

(54) V-BELT PULLEY

(75) Inventor: Valdemar R. Birn, London (GB)

(73) Assignee: Vald.Birns Maskinfabrik A/S, Holstebro (DK)

( * ) Notice: Subject to any disclaimer, the term of this patent is extended or adjusted under 35 U.S.C. 154(b) by 0 days.

(21) Appl. No.: 09/787,653

(22) PCT Filed: Oct. 6, 1998

(86) PCT No.: PCT/DK98/00427

§ 371 (c)(1),
(2), (4) Date: Mar. 20, 2001

(87) PCT Pub. No.: WO00/20781

PCT Pub. Date: Apr. 13, 2000

(51) Int. Cl.[7] ............................ F16H 55/49; F16H 55/50
(52) U.S. Cl. ..................... 474/168; 474/174; 29/892.11; 29/892.3
(58) Field of Search ................................ 474/166, 167, 474/168, 169, 170, 171, 172, 173, 174; 29/892, 892.11, 892.1, 892.2, 892.3; D8/360; D12/123, 110, 114

(56) References Cited

U.S. PATENT DOCUMENTS

| 1,900,222 A | | 3/1933 | Bowen | |
|---|---|---|---|---|
| 2,923,166 A | * | 2/1960 | Brindley et al. | 29/892.11 |
| 2,933,935 A | * | 4/1960 | Sterkel | 474/174 |
| 4,018,096 A | | 4/1977 | Foster | 74/230.01 |
| 4,482,340 A | * | 11/1984 | Kovaleski | 29/892.11 |
| 4,509,933 A | | 4/1985 | Miranti, Jr. et al. | 474/93 |
| 4,600,400 A | | 7/1986 | Hallerback | 474/166 |
| 4,629,444 A | | 12/1986 | Miranti, Jr. | 474/93 |
| 4,828,537 A | * | 5/1989 | Jourdain et al. | 29/892.1 |
| 5,147,249 A | * | 9/1992 | Lewis et al. | 29/892 |

FOREIGN PATENT DOCUMENTS

| GB | 865797 | | 4/1961 | |
|---|---|---|---|---|
| JP | 57171160 | * | 10/1982 | 29/892.2 |

* cited by examiner

Primary Examiner—Christopher P. Schwartz
Assistant Examiner—Devon Kramer
(74) Attorney, Agent, or Firm—Sidley Austin Brown & Wood LLP

(57) ABSTRACT

V-belt pulley comprising an outer rim (2) provided with at least one V-belt groove (7) formed by turning, said groove (7) having a bottom (9) provided with a plurality of radially through-going and circumferentially interspaced openings (8). The pulley is cast with a rim (2) having a radially inwardly facing surface (4) is provided with a plurality of circumferentially interspaced recesses (5) of such a radial depth that the radially through-going openings are formed by the turning thereof.

38 Claims, 1 Drawing Sheet

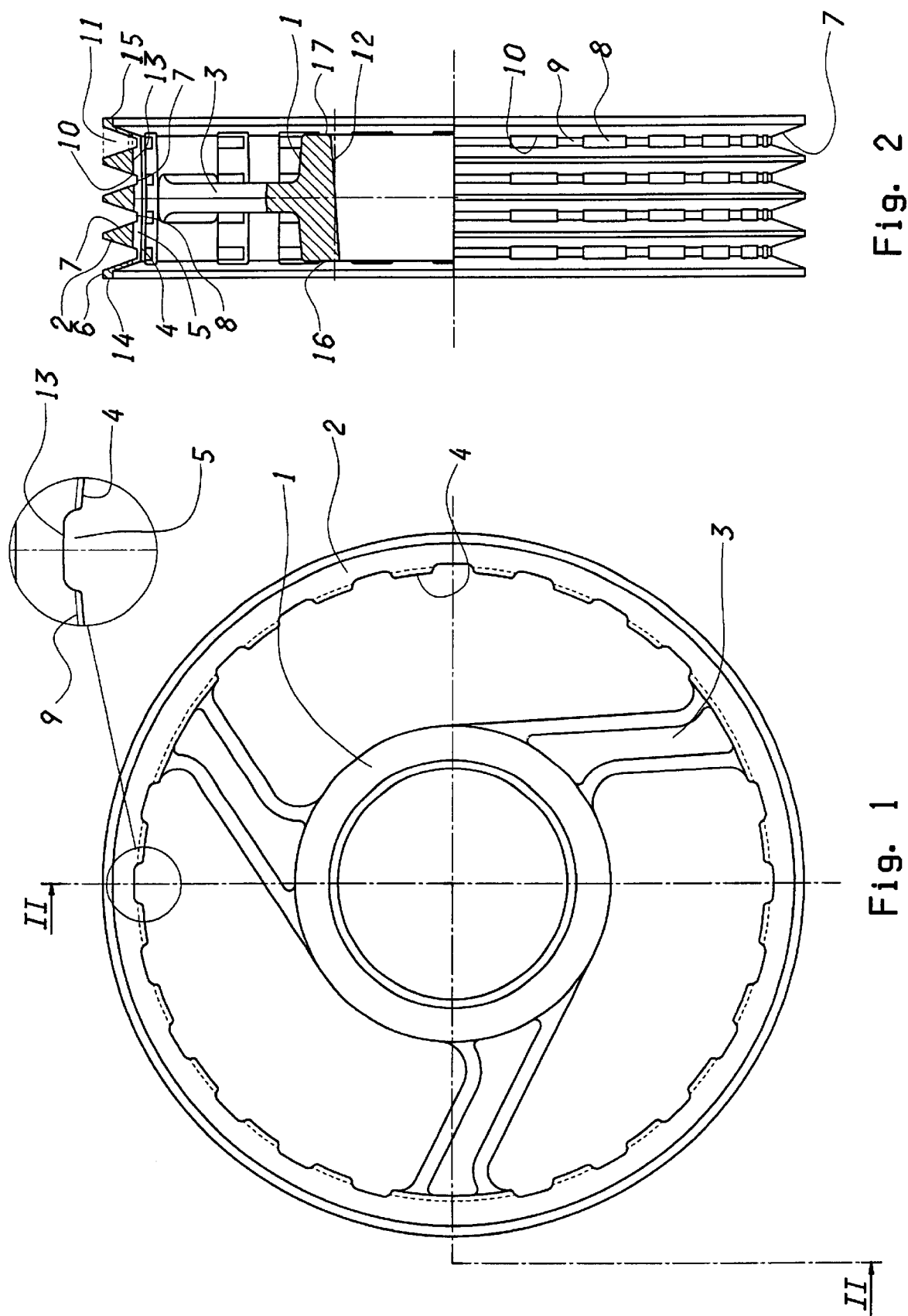

V-BELT PULLEY

TECHNICAL FIELD

The invention relates to a V-belt pulley comprising an outer rim provided with at least one outwardly facing V-belt groove formed by turning in whose bottom a plurality of radially through-going openings are circumferentially interspaced and extend to the radially inwardly facing surface of the rim.

BACKGROUND ART

Such a V-belt pulley is known from GB patent nr. 865 797, in which the radial openings are formed by radial cutting through the rim of the V-belt pulley.

BRIEF DESCRIPTION OF THE INVENTION

The object of the invention is to provide a V-belt pulley of the above type which can be made in a simple and rational manner.

The V-belt pulley according to the invention is characterised in that the pulley is cast with a rim having a radially inwardly facing surface provided with a plurality of circumferentially interspaced recesses of such a radial depth that the bottom thereof is arranged radially outside of the bottom of the V-belt groove such that the radially through-going openings are made by the turning thereof.

By forming the V-belt pulley with said recesses in its rim, the openings are automatically produced by turning of the V-belt groove. The cutting process of the V-belt pulley may thus be carried out in a manner corresponding to a conventional V-belt pulley without radial openings, whereby separate machining thereof is avoided. Consequently V-belt pulleys with openings which act to cool the pulley and V-belt and thus prolongs the life of the latter can be made essentially without increased production costs. Tests have shown that by using the V-belt pulley according to the invention the belt temperature is decreased by 10–15° C. in relation to the use of conventional V-belt pulleys without radial openings in the bottom of the groove.

According to the invention, when seen in axial direction the radial recesses may have a groove-like form and thus be cast without using separate cores.

Furthermore according to the invention the recesses may be axially through-going from one side of the pulley to the other.

Moreover according to the invention the openings may be substantially evenly interspaced when seen in circumferential direction.

According to the invention, the radial openings may be of a length substantially corresponding to their interspacing when seen in circumferential direction.

Furthermore according to the invention the length of the openings may be 7–30 mm, preferably 15–25 mm when seen in circumferential direction.

Moreover according to the invention the depth of the recesses is such that the radial outer portion of the openings made by the turning of the groove is arranged radially inside of the V-belt received in the groove, whereby the V-belt does not engage the portion of the V-belt groove, in which the openings are formed.

Finally according to the invention the V-belt pulley may be made of SG iron.

BRIEF DESCRIPTION OF THE DRAWINGS

The invention is explained in greater detail below with reference to the accompanying drawing, in which FIG. 1 is a side view of the V-belt pulley according to the invention and FIG. 2 illustrates the V-belt pulley in FIG. 1 along the line II—II in FIG. 1.

BEST MODE FOR CARRYING OUT THE INVENTION

The drawing illustrates a cast V-belt pulley according to the invention comprising a hub 1 connected to a rim 2 by means of three spokes 3. During casting a plurality of recesses 5 is formed in the radially inwardly facing surface 4 of the rim, said recesses 5 being circumferentially evenly interspaced between the spokes 3. In axial direction the recesses 5 have a groove-like form and extend from one side of the rim to the other. Four V-belt grooves 7 are formed in the outer surface of the rim by turning. The depth of the grooves 7 and the recesses 5 is such that openings 8 are formed between the bottom 9 of the grooves adjacent recesses when the grooves are turned. In other words, the bottom 13 of the recesses is arranged radially outside of the bottom 9 of the grooves 7. For illustration hereof the bottom 9 of the grooves 7 is shown as a dotted line in FIG. 1 and in the enlarged section thereof—even though it is not visible in these Figures.

As it appears from the far right groove in FIG. 2, the depth of the recesses 5 is further such that the radially outer portion 10 of the openings formed by turning of the grooves is arranged radially inwardly of a V-belt 11 (shown dotted) received in the groove, whereby the V-belt is prevented from coming into contact with the openings and thus from being damaged. The hub is provided with an axial conical bore for mounting the V-belt pulley on a shaft.

As mentioned above the V-belt pulley is made by cutting of a cast workpiece. The cast workpiece may be formed by any casting process, i.e., by using a non-permanent (expendable) mould or a permanent mould. Furthermore the cast workpiece may be of any metal or iron alloy. However, preferably the cast workpiece is made of SG iron by sand casting.

Preferably, the only surfaces of the V-belt pulley which are processed by machining are. The outer peripheral face 6 of the groove 7, the lateral faces 14, 15 and the bore 12 and the lateral faces 16,17 of the hub 1.

As a result of the obtained cooling action, the V-belt pulley according to the invention is particularly advantageous in connection with the various types of narrow V-belts, ie type SPA, SPZ, SPB and SPC, but can of course be adapted to other types of V-belts.

What is claimed is:

1. A V-belt pulley which is cast with an outer rim having a radially inwardly facing surface and with a plurality of cast recesses circumferentially spaced along said inwardly facing surface with each recess having a depth which extends radially outwardly from said inwardly facing surface; and at least one radially outwardly facing V-belt groove formed in said outer rim by turning, each said at least one V-belt groove having a bottom which intersects said radially outwardly extending recesses to form a plurality of circumferentially spaced openings extending from the respective V-belt groove to the inwardly facing surface of the outer rim.

2. A V-belt pulley in accordance with claim 1, wherein each recess is a groove which extends generally parallel to an axial direction of said V-belt pulley.

3. A V-belt pulley in accordance with claim 2, wherein each recess extends from a first side of the pulley to a second side of the pulley.

4. A V-belt pulley in accordance with claim 3, wherein said openings are substantially evenly spaced when viewed in circumferential direction of said outer rim.

5. A V-belt pulley in accordance with claim 4, wherein each opening has a length in the circumferential direction of said outer rim which substantially corresponds to spacing between the openings in the circumferential direction of said outer rim.

6. A V-belt pulley in accordance with claim 5, wherein the depth of the recesses is such that a V-belt received in the respective V-belt groove would not enter the radially outer portions of the openings.

7. A V-belt pulley in accordance with claim 4, wherein the depth of the recesses is such that a V-belt received in the respective V-belt groove would not enter the radially outer portions of the openings.

8. A V-belt pulley in accordance with claim 3, wherein each opening has a length in the circumferential direction of said outer rim which substantially corresponds to spacing between the openings in the circumferential direction of said outer rim.

9. A V-belt pulley in accordance with claim 8, wherein the depth of the recesses is such that a V-belt received in the respective V-belt groove would not enter the radially outer portions of the openings.

10. A V-belt pulley in accordance with claim 3, wherein the depth of the recesses is such that a V-belt received in the respective V-belt groove would not enter the radially outer portions of the openings.

11. A V-belt pulley in accordance with claim 2, wherein said openings are substantially evenly spaced when viewed in circumferential direction of said outer rim.

12. A V-belt pulley in accordance with claim 11, wherein each opening has a length in the circumferential direction of said outer rim which substantially corresponds to spacing between the openings in the circumferential direction of said outer rim.

13. A V-belt pulley in accordance with claim 12, wherein the depth of the recesses is such that a V-belt received in the respective V-belt groove would not enter the radially outer portions of the openings.

14. A V-belt pulley in accordance with claim 11, wherein the depth of the recesses is such that a V-belt received in the respective V-belt groove would not enter the radially outer portions of the openings.

15. A V-belt pulley in accordance with claim 2, wherein each opening has a length in the circumferential direction of said outer rim which substantially corresponds to spacing between the openings in the circumferential direction of said outer rim.

16. A V-belt pulley in accordance with claim 15, wherein the depth. of the recesses is such that a V-belt received in the respective V-belt groove would not enter the radially outer portions of the openings.

17. A V-belt pulley in accordance with claim 2, wherein the depth of the recesses is such that a V-belt received in the respective V-belt groove would not enter the radially outer portions of the openings.

18. A V-belt pulley in accordance with claim 1, wherein each recess extends from a first side of the pulley to a second side of the pulley.

19. A V-belt pulley in accordance with claim 18, wherein said openings are substantially evenly spaced when viewed in circumferential direction of said outer rim.

20. A V-belt pulley in accordance with claim 19, wherein each opening has a length in the circumferential direction of said outer rim which substantially corresponds to spacing between the openings in the circumferential direction of said outer rim.

21. A V-belt pulley in accordance with claim 20, wherein the depth of the recesses is such that a V-belt received in the respective V-belt groove would not enter the radially outer portions of the openings.

22. A V-belt pulley in accordance with claim 19, wherein the depth of the recesses is such that a V-belt received in the respective V-belt groove would not enter the radially outer portions of the openings.

23. A V-belt pulley in accordance with claim 18, wherein each opening has a length in the circumferential direction of said outer rim which substantially corresponds to spacing between the openings in the circumferential direction of said outer rim.

24. A V-belt pulley in accordance with claim 23, wherein the depth of the recesses is such that a V-belt received in the respective V-belt groove would not enter the radially outer portions of the openings.

25. A V-belt pulley in accordance with claim 18, wherein the depth of the recesses is such that a V-belt received in the respective V-belt groove would not enter the radially outer portions of the openings.

26. A V-belt pulley in accordance with claim 1, wherein said openings are substantially evenly spaced when viewed in circumferential direction of said outer rim.

27. A V-belt pulley in accordance with claim 26, wherein each opening has a length in the circumferential direction of said outer rim which substantially corresponds to spacing between the openings in the circumferential direction of said outer rim.

28. A V-belt pulley in accordance with claim 27, wherein the depth of the recesses is such that a V-belt received in the respective V-belt groove would not enter the radially outer portions of the openings.

29. A V-belt pulley in accordance with claim 26, wherein the depth of the recesses is such that a V-belt received in the respective V-belt groove would not enter the radially outer portions of the openings.

30. A V-belt pulley in accordance with claim 1, wherein each opening has a length in the circumferential direction of said outer rim which substantially corresponds to spacing between the openings in the circumferential direction of said outer rim.

31. A V-belt pulley in accordance with claim 30, wherein the depth of the recesses is such that a V-belt received in the respective V-belt groove would not enter the radially outer portions of the openings.

32. A V-belt pulley in accordance with claim 1, wherein the depth of the recesses is such that a V-belt received in the respective V-belt groove would not enter the radially outer portions of the openings.

33. A method of forming a V-belt pulley which comprises the steps of:

casting a pulley with an outer rim having a radially inwardly facing surface and with a plurality of cast recesses circumferentially spaced along said inwardly facing surface with each recess having a depth which extends radially outwardly from said inwardly facing surface; and then machining at least one radially outwardly facing V-belt groove in the outer rim of the thus cast pulley, with each said at least one V-belt groove having a bottom which intersects said radially outwardly extending recesses to form a plurality of circumferentially spaced openings extending from the respective V-belt groove to the inwardly facing surface of the outer rim.

34. A method in accordance with claim 33, wherein each recess is a groove which extends generally parallel to an axial direction of said V-belt pulley.

35. A method in accordance with claim 33, wherein each recess extends from a first side of the pulley to a second side of the pulley.

36. A method in accordance with claim 33, wherein said openings are substantially evenly spaced when viewed in circumferential direction of said outer rim.

37. A method in accordance with claim 33, wherein each opening has a length in the circumferential direction of said outer rim which substantially corresponds to spacing between the openings in the circumferential direction of said outer rim.

38. A method in accordance with claim 33, wherein the depth of the recesses is such that a V-belt received in the respective V-belt groove would not enter the radially outer portions of the openings.

\* \* \* \* \*